United States Patent [19]

Van De Venter et al.

[11] Patent Number: 5,302,524
[45] Date of Patent: Apr. 12, 1994

[54] COAL DERIVED OXIDATION PRODUCT FOR SEEDLING GROWTH STIMULATION

[75] Inventors: Hendrik A. Van De Venter; Johannes Dekker, both of Pretoria; Izak J. Cronje, Verwoerdburg, all of South Africa

[73] Assignee: National Energy Council, Pretoria, South Africa

[21] Appl. No.: 523,077

[22] Filed: May 14, 1990

[30] Foreign Application Priority Data

May 15, 1989 [ZA] South Africa ............... 89/3611

[51] Int. Cl.$^5$ ............... C12N 5/00; C05F 11/02; C07C 65/01
[52] U.S. Cl. ............... 435/240.54; 71/23; 71/24; 435/240.4; 435/240.45; 435/240.49; 435/240.5; 562/475; 504/324
[58] Field of Search ............... 435/240.54, 240.45, 435/240.49, 240.5, 240.4; 562/475; 71/65, 77, 23, 79, 98, 113, 24

[56] References Cited

U.S. PATENT DOCUMENTS

| | | | |
|---|---|---|---|
| 3,770,411 | 11/1973 | Chambers | 71/24 |
| 4,305,728 | 12/1981 | Schultz | 44/51 |
| 4,541,857 | 9/1985 | Snively | 71/24 |
| 5,004,831 | 4/1991 | Dekker | 562/475 |

FOREIGN PATENT DOCUMENTS

| | | |
|---|---|---|
| 0282250 | 9/1988 | European Pat. Off. . |
| 0298710 | 1/1989 | European Pat. Off. . |
| A719261 | 2/1932 | France . |
| WO8702355 | 4/1987 | PCT Int'l Appl. . |
| 361890 | 11/1931 | United Kingdom . |
| 473647 | 10/1937 | United Kingdom . |

OTHER PUBLICATIONS

Hartmann, T., et al. Plant Propagation-Principles and Practices, Second Edition, Prentice-Hall, 1968 p. 265

*Primary Examiner*—Michael G. Wityshyn
*Assistant Examiner*—Jane A. Williams
*Attorney, Agent, or Firm*—Cushman Darby & Cushman

[57] ABSTRACT

A method of stimulating seedling growth which comprises applying a coal-derived oxidation product to the medium in which the seedling is growing. The product is in the form of a solution or a slurry having a pH in the range of 2 to 12 and has the following elemental and functional group analysis (on an air-dried basis):

| ELEMENTAL ANALYSIS | |
|---|---|
| Element | Range (%) |
| Carbon | 30–70 |
| Hydrogen | 2–6 |
| Nitrogen | 0.1–5 |
| Sulphur | 0.1–10 |
| Oxygen | 15–45 |

| FUNCTIONAL GROUP ANALYSIS | |
|---|---|
| Functional Group | Range (meq/g) |
| Total acidity | 3–13 |
| Carboxylic groups | 0.5–12 |
| Phenolic groups | 0.5–9 |

11 Claims, 1 Drawing Sheet

COAL DERIVED OXIDATION PRODUCT FOR SEEDLING GROWTH STIMULATION

BACKGROUND OF THE INVENTION

This invention relates to seedling growth stimulation.

The production of seedlings constitutes a very major market. This market includes seedlings which are produced for sale to others and seedlings which are produced for the producers' own use, e.g. in forest stations. There are many advantages in producing seedlings which grow to a required size quickly and which produce good, strong root growth. Seedling growth stimulants are available on the market, but they tend to be rather expensive.

SUMMARY OF THE INVENTION

According to the present invention, a method of stimulating seedling growth includes the step of applying a coal-derived oxidation product in the form of a solution or slurry having a pH of 2 to 12 to the medium in which growth is to take place, the coal-derived oxidation product having the following elemental and functional group analysis (on an air-dried basis):

| ELEMENTAL ANALYSIS | |
|---|---|
| Element | Range (%) |
| Carbon | 30–70 |
| Hydrogen | 2–6 |
| Nitrogen | 0.1–5 |
| Sulphur | 0.1–10 |
| Oxygen | 15–45 |

| FUNCTIONAL GROUP ANALYSIS | |
|---|---|
| Functional Group | Range (meq/g) |
| Total acidity | 3–13 |
| Carboxylic groups | 0.5–12 |
| Phenolic groups | 0.5–9 |

Further according to the invention, there is provided a composition for stimulating seedling growth comprising, as an active ingredient, a coal-derived oxidation product as defined above.

DESCRIPTION OF EMBODIMENTS

Figure 1:
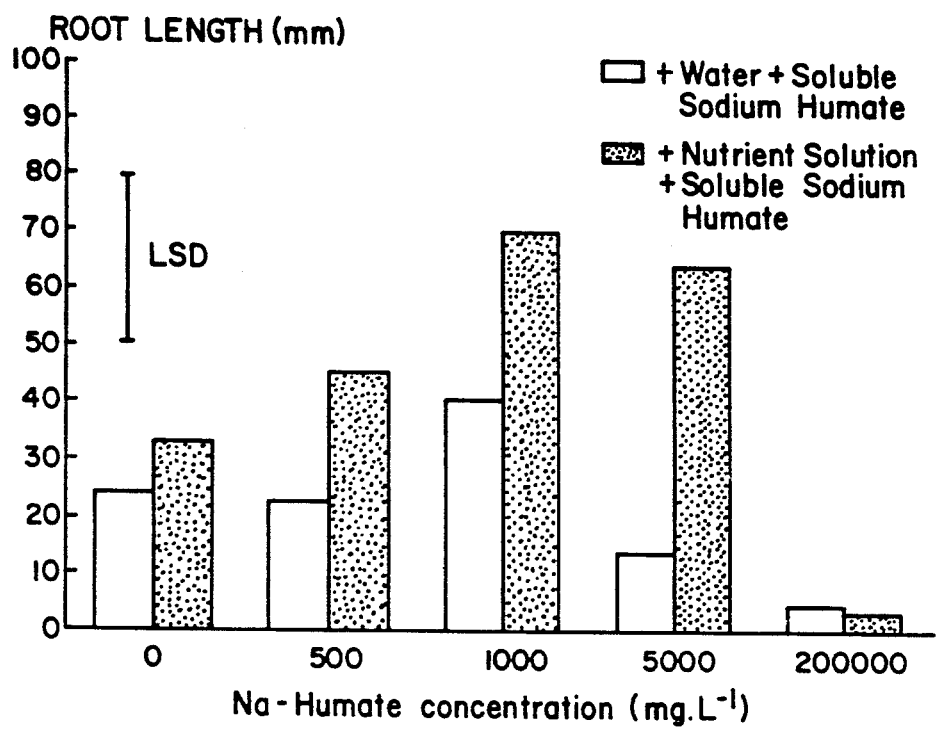
FIGS. 1 and 2 illustrate graphically the results obtained from experiments 1 and 2.

The commercial seedling growers and end users of seedlings require a low shoot-to-root mass ratio which is favourable for the plant after transplanting. It has been found that application of a coal-derived oxidation product as defined above to the medium in which the seedling growth is to occur improves the root growth of the seedling and leads to a low shoot-to-root mass ratio. The coal-derived oxidation product is preferably applied post-emergence, i.e. after a shoot has emerged, to the medium.

The amount of the coal-derived oxidation product which is applied to the medium will vary according to the nature of the product, the seedling and the medium in which the growth is taking, or is to take, place. As a general rule, the concentration of coal-derived oxidation product in the slurry or solution will be no more than 5000 milligrams/liter, and generally no more than 1000 milligrams/liter.

The coal-derived oxidation product may be one derived from a coal which has been oxidised in a dry or a wet state. The wet state oxidation is preferred.

A typical example of a dry state oxidation involves oxidising the coal with oxygen or a mixture of oxygen and nitrogen, particularly air, at a temperature between 120° and 350° C. at a partial pressure of oxygen between 0.1 and 10 atmospheres, preferably between 0.1 and 5 atmospheres, for a contact time between 15 and 600 minutes.

The preferred wet oxidation method is that described and claimed in European Patent Publication No. 0298710, the contents of which are reproduced in the following paragraphs. The method of this European patent publication involves mixing coal with an aqueous medium to produce a slurry having a pH in the range 4 to 9, reacting the slurry with a gaseous oxidant selected from oxygen, air and mixtures thereof under conditions of temperature and pressure and for a period to cause the oxidation of the coal. The thus oxidised product will contain humic acids and some fulvic acids.

Various oxidation routes for the production of humic and/or fulvic acids from coal have been discussed in the literature. For example, oxidation with nitric acid or nitrogen oxides is discussed and described in British patent 1,283,385. Further, oxidation of coal with oxygen in an aqueous alkaline phase is described in the United States Bureau Mines Internal Circular, No. 8234, 1963, pages 74 to 99. The process of this latter reference involves slurrying particulate coal with a dilute caustic solution and then oxidising with gaseous oxygen under elevated temperature and pressure conditions. The pH of the slurry will be very high and at least 12 or higher. Under these conditions, the acids which will be produced will be both humic and fulvic acids with the fulvic acids constituting a high percentage. Both these acids are soluble in solutions of this high pH. The general shortcomings of these liquid medium routes are high consumption of expensive reagents, e.g. alkali, poor product selectivity and long reaction times.

Friedman and Kinney (Ind. Eng. Cham. 42, 2525 [1950]) studied the fixed-bed air-oxidation of coals ranging from lignite to low volatile bituminous coals, achieving humic acid yields of up to 96.5%. This approach is however hampered by serious spontaneous combustion problems which disqualifies such "dry" air-oxidation processes for commercial application.

According to the invention a process for producing a solid oxidised coal containing humic acids includes the steps of:
(a) mixing coal with an aqueous medium to produce a slurry having a pH in the range 4 to 9;
(b) reacting the slurry with a gaseous oxidant selected from oxygen, air and mixtures thereof under conditions of temperature and pressure and for a time to cause the oxidation of the coal thereby producing oxidised coal containing humic acids; and
(c) separating the oxidised coal containing humic acids from the aqueous medium.

The accompanying drawing illustrates a flow diagram of an embodiment of the invention.

The product which is produced by the process of the invention is a solid oxidised coal which contains humic acids. In the process, some fulvic acids will also be produced. Fulvic acids are soluble in aqueous mediums of pH in the range 4 to 9 and will therefore not be present in the separated oxidised coal except in trace amounts.

The pH of the slurry will depend to a large extent on the nature of the coal which is being oxidised. The aqueous medium may contain a buffer but otherwise no expensive reagents such as alkali as are necessary in the liquid medium oxidation processes mentioned above need to be used.

The humic acids are not soluble in aqueous mediums of pH in the range 4 to 9. Consequently, the invention results in a high proportion of humic acids and only a very small proportion of fulvic acids being produced. The humic acids are trapped in the separated oxidised coal and may easily be separated therefrom by treating the oxidised coal with a strong alkali solution, e.g. having a pH of 12 or higher and separating the solid oxidised coal from the alkali solution which now contains the humic acids in dissolved form. Examples of suitable alkali solutions are sodium hydroxide and ammonium hydroxide solutions.

In the oxidised coal the major oxidation product will be humic acids. The oxidised coal will also contain minor quantities of other oxidation products as well as unreacted materials such as ash.

The fulvic acids may be recovered from the separated aqueous medium by extraction with a suitable organic solvent such as butanone.

The slurry will have a pH in the range 4 to 9. Preferably, the slurry will have a pH in the range 6 to 8, more preferably a pH of about 7.

The slurry preferably has a solids content, i.e. a content of coal particles, in the range 5 to 70% by weight of the slurry. More preferably, the slurry has a solids content in the range 10 to 60% by weight of the slurry.

The coal will typically be a coal with a rank ranging from lignite to low volatile bituminous.

The mean particle size of the coal will normally be less than 3 mm. Preferably the mean particle size of the coal varies in the range 10 to 1000 microns. More preferably, the coal will have a mean particle size in the range 10 to 100 microns. Thus, the invention has particular, but not exclusive, application to fine coals.

The second step of the process of the invention involves reacting the slurry with a gaseous oxidant which is oxygen or air or a mixture of oxygen and air under suitable conditions of temperature and pressure and for a time sufficient to produce the oxidised product in acceptable yields.

The reaction is preferably carried out in a pressurised reactor system equipped with a suitable distributor or stirring mechanism to ensure effective mass and heat transfer between the gaseous, liquid and solid phases.

The oxidation step is preferably carried out at an elevated temperature in the range 100° C. to 300° C. The preferred temperature within this range is influenced by the chemical and physical properties of the coal, and other parameters, e.g. slurry concentration and pressure.

The oxidation step is preferably carried out under elevated pressure which is sufficient to ensure substantial oxidation of the coal. Different types of coal, i.e. coal with different reactivities will require different pressures. Suitable pressures (at the elevated temperature) are oxygen partial pressures in the range 0.1 to 10 MPa. more preferably 2 to 8 MPa. Most preferably, the oxidation step is carried out at an oxygen partial pressure of approximately 3 to 4 MPa.

The oxidation step is continued for a period of time sufficient to produce the product quantity and quality required. Generally, the oxidation step will be carried out for a period of between 5 and 600 minutes, more preferably between 20 and 60 minutes, depending on the coal reactivity and the applied reaction conditions. Generally, oxidation times in excess of 60 minutes will not be necessary. This represents a significant advantage over the "dry" air-oxidation methods described above where much longer oxidation times are necessary.

The coal-derived humic acids may, for example, find application as soil conditioners, organic fertilisers, briquette and pellet binders, drilling fluid dispersants and viscosity control agents, whilst the coal-derived fulvic acids may be utilised for the production of fuel extenders, plasticisers and petrochemicals.

The process of the invention has a number of advantages over the caustic medium oxidation processes and "dry" air-oxidation processes mentioned above. These advantages are:

In relation to caustic medium oxidation processes:

No expensive reagents or catalysts are needed.

High humic acids yields and selectivity are achieved.

In relation to "dry" air-oxidation processes:

The water-soluble fulvic acids are readily separated from the insoluble oxidised coal containing up to 88% (on a carbon basis) alkali-soluble humic acids.

Ease of temperature control. No run-aways are experienced compared to dry air-oxidation (packed bed, stirred or fluidised-bed conditions).

High concentrations of coal water slurries can be used, i.e. high coal throughput per reactor volume unit is achieved.

Short reaction periods for high coal conversions are achieved by applying increased partial oxygen pressure. If pure oxygen is used as oxidant, unspent oxygen in the product gas can be recovered and recycled after removal of the carbon dioxide (major component) and carbon monoxide (minor component) formed in the oxidation process.

The process can be carried out in a batch or continuous mode. In the case of continuous operation sufficient heat is generated by the oxidation process to heat fresh slurry feed and oxygen from room temperature to the required reaction temperature.

An embodiment of the invention will now be described with reference to the attached flow diagram. Referring to this diagram, raw coal is milled and then screened to remove oversize particles. The milled product is delivered to a slurry tank where water is added to produce the slurry. The slurry is delivered to a reactor where the oxidation takes place. After the oxidation has been completed, the gas is removed in a gas/liquid separator. This gas contains oxygen, carbon dioxide and carbon monoxide. The carbon dioxide and carbon monoxide are removed from the gas and the oxygen recycled to the reactor. The solid oxidised coal containing humic acids and the aqueous medium containing the dissolved fulvic acids are delivered to a screening step where the oxidised coal containing humic acids is removed by filtration from the aqueous medium containing the fulvic acids.

The invention is further illustrated by the following Examples.

EXAMPLE 1

800 g of a South African bituminous coal (analysis in Table 1) with a mean particle size of 10 microns was slurried in 1000 ml water and quantitatively transferred to an autoclave of 1800 ml capacity, and equipped with a stirrer and a cooling coil. The stirrer and heater were started simultaneously, while a constant flow (5 liter per minute, ambient conditions) of pressurized oxygen (4 MPa) was passed through the slurry. The temperature was controlled at 200° C.+2° C. for a reaction period of one hour after which the reaction was terminated by passing cold water through the cooling coil.

The humic acids content of the oxidised coal, obtained by filtering the reaction mixture, was then determined as follows: 10 g of oxidised coal (analysis in Table 2), quantitatively transferred to a round bottom flask, was mixed with 10 g of sodium hydroxide pellets and refluxed for five hours after which the reaction mixture was cooled and centrifuged to separate the undissolved residue.

The residue was washed twice with 0.1N NaOH solution and twice with water. All the washings were added to the solution obtained after centrifuging. The residue was dried, weighed and the organic content determined.

The humic acids contained in the solution were recovered by precipitation, after acidification with hydrochloric acid to a pH value of 2. The now insoluble humic acids were centrifuged, washed with 0.1N HCl solution and water. After drying to constant mass the solid humic acids were weighed and analysed for organic content.

The fulvic acids were obtained by extracting the butanone the acidic solution and washings after saturating it with sodium sulphate. The butanone fraction was dried over anhydrous $Na_2SO_4$, filtered and evaporated to dryness. The material thus obtained was weighed and the organic content determined.

The results are given below:
% oxidised coal recovered=66.1 (on carbon basis, relating to daf raw coal)
% humic acids recovered=87.4 (on carbon basis, relating to oxidised coal)
% fulvic acids recovered=3.7 (on carbon basis, relating to daf raw coal) "daf"=dry ash free.

TABLe 1

| ANALYSIS OF SOUTH AFRICAN BITUMINOUS COAL | |
|---|---|
| Proximate and Ultimate Analysis | |
| $H_2O$ | 1.5% |
| Ash | 11.4% |
| Vol Mat | 34.1% |
| Fix Carb | 53.0% |
| % C | 69.81 |
| % H | 4.65 |
| % N | 1.80 |
| % S | 0.71 |
| % O | 10.36 |
| Petrographic Analysis | |
| Vitrinite | 84.9% |
| Exinite | 4.49% |
| Inertinite | 5.8% |
| Visible minerals | 4.9% |
| % ROV | 0.65 |

TABLE 2

| Analysis of Oxidised Coal | |
|---|---|
| % $H_2O$ | 12.1 |
| % Ash | 9.8 |
| Volatile Material | 35.6 |
| Fixed Carbon | 42.5 |
| % C | 51.10 |
| % H | 2.23 |
| % N | 1.42 |
| % S | 0.37 |

TABLE 2-continued

| Analysis of Oxidised Coal | |
|---|---|
| % O | 22.98 |

EXAMPLE 2

The same reactor system was used as in Example 1. The reaction conditions were as follows:
Coal particle size: −500+200 microns
Slurry used: 200 gm coal plus 400 ml water
Oxygen pressure: 3 MPa
Oxygen flowrate: 4 liters per minute
Temperature: 200° C.
Reaction period: 1 hour
The results were as follows:
% oxidised coal recovered=81.4 (on carbon basis, relating to daf raw coal)
% humic acids recovered=71.4 (on carbon basis, relating to oxidised coal)
% fulvic acids recovered=4.2 (on carbon basis, relating to daf raw coal)

EXAMPLE 3

The same reactor system as in Example 1 was used except a slurry pump was connected to it in order to feed a coal slurry continuously. The reaction conditions were as follows:
Mean coal particle size: 10 microns
Slurry concentration: 15%
Slurry flowrate: 850 ml per hour
Oxygen pressure: 4 MPa
Oxygen flowrate: 4 liters per minute
Temperature: 180° C.
Residence time: 1.5 hour
The results were as follows:
% oxidised coal recovered=60.9 (on carbon basis, relating to daf raw coal)
% humic acids recovered=63.4 (on carbon basis, relating to oxidised coal)
% fulvic acids recovered=4.1 (on carbon basis, relating to daf raw coal)

The wet oxidation process of the above mentioned European patent publication results in a slurry being produced. This slurry contains insoluble oxidised coal and some water-soluble fulvic acids. The matrix of the coal will have been opened at least partially. Further, the minerals of the coal will be present in the slurry. The slurry may be treated with a suitable base to bring the pH of the slurry to 2 to 12, typically to 5 to 9. Such a slurry is one example of a coal-derived oxidation product used in the practice of the invention and will hereinafter be referred to as "formulated oxiproduct".

The slurry which is produced by the wet oxidation process of the above European patent publication may be filtered to produce an insoluble oxidised coal. This insoluble oxidised coal may be treated with a suitable base to bring it to a pH in the range 2 to 12, typically 5 to 9. This product forms another coal-derived oxidation product useful in the practice of the invention and will hereinafter be referred to as "formulated oxicoal".

The bases which will generally, but not exclusively, be used will be alkali metal hydroxides, typically sodium hydroxide.

The formulated oxiproduct and formulated oxicoal will typically have the following elemental and functional group analysis (on an air-dried basis):

| ELEMENTAL ANALYSIS | | |
|---|---|---|
| Element | Range (%) | Typical Percentage |
| Carbon | 40–70 | 51.3 |
| Hydrogen | 2–6 | 2.3 |
| Nitrogen | 0.1–5 | 1.5 |
| Sulphur | 0.1–10 | 0.5 |
| Oxygen | 15–40 | 28.7 |
| FUNCTIONAL GROUP ANALYSIS | | |
| Functional Group | Range (meq/g) | Typical Amount (meq/g) |
| Total acidity | 3–12 | 6.25 |
| Carboxylic groups | 0.5–7 | 2.16 |
| Phenolic groups | 0.5–9 | 4.09 |

Another preferred form of a coal-derived oxidation product for use in the practice of the invention is a solution of a soluble humate (hereinafter referred to as "oxihumate") in water. The solution will have a pH in the range 4 to 12. The oxihumate will typically have an elemental and functional group analysis (on an air-dried basis) as follows:

| ELEMENTAL ANALYSIS | | |
|---|---|---|
| Element | Range (%) | Typical Percentage |
| Carbon | 30–70 | 55.5 |
| Hydrogen | 2–6 | 2.7 |
| Nitrogen | 0.1–5 | 1.5 |
| Sulphur | 0.1–10 | 0.3 |
| Oxygen | 20–45 | 32.1 |
| FUNCTIONAL GROUP ANALYSIS | | |
| Functional Group | Range (meq/g) | Typical Amount (meq/g) |
| Total acidity | 3–13 | 7.45 |
| Carboxylic groups | 0.5–12 | 3.38 |
| Phenolic groups | 0.5–9 | 4.07 |

This coal-derived oxidation product may be produced by taking the insoluble oxidised coal from a wet oxidation process of the type described in the above mentioned European patent publication, mixing this oxidised coal with aqueous alkali, heating the mixture to a temperature above 20° C. and below 250° C. under sufficient pressure, if necessary, to limit evaporation of the water, and maintaining the elevated temperature for a time sufficient to extract a substantial amount of the available humate in the form of soluble humate. The aqueous alkali will typically, but not exclusively, be an aqueous alkali metal hydroxide such as sodium hydroxide. After cooling, the resultant mixture or its filtrate is the product which is used.

Certain experiments have been carried out to demonstrate the seedling growth stimulant properties of the coal-derived oxidation products described above. These experiments are set out hereinafter.

EXPERIMENT 1

Stimulation of Root Growth in Petri Dishes—Biotest

Experiments were conducted in petri dishes. Oxihumate or formulated oxicoal, both products produced and having the typical elemental and functional analyses referred to above, were added after the seeds had been allowed to germinate without additives for three days. Root and shoot growth were measured after a further four days. The following results were obtained:

Particularly good primary root length was obtained for onion, wheat and lettuce with soluble sodium humate.

A significant increase in canteloup root growth was obtained when a nutrient solution (a standard Hoaglands solution) was added in conjunction with the oxihumate. The results are set out graphically in FIG. 1. It will be noted from this figure that the optimum concentration was found to be 500 to 1000 mg of product per liter.

The formulated oxicoal was found significantly to stimulate primary root growth of wheat and lettuce.

EXPERIMENT 2

Stimulation of Root Growth in Polystyrene Trays Containing Commercial Pine Bark Medium A. Lettuce seedlings were grown in pine bark medium and formulated oxiproduct produced, and having the typical elemental and functional group analysis, as described above, was applied in varying concentrations to the medium.

Significant increases in root dry mass were obtained from applications of 250 and 1000 mg/l of the formulated oxiproduct. Further, shoot mass was significantly lower compared with a Hoaglands nutrient solution control which led to a significant reduction in the shoot: root dry mass ratio.

Figure 2:
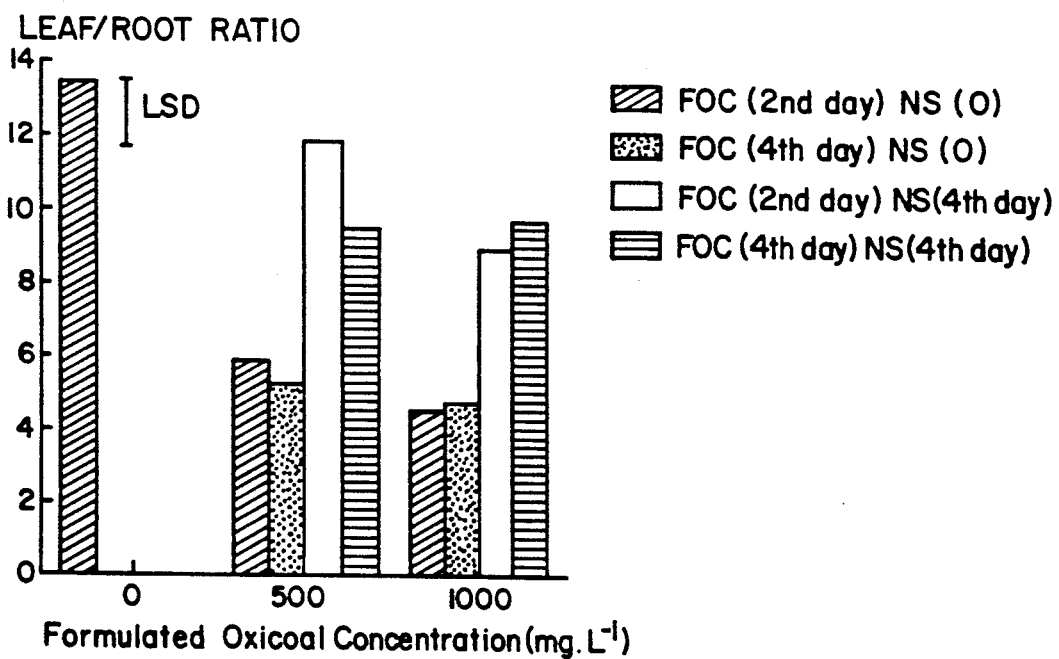

B. Lettuce seedlings were grown in a pine bark medium and formulation oxicoal was applied with and without a Hoagland's nutrient solution. The influence of a formulated oxicoal, as in Experiment 1, and the nutrient solution on the growth of lettuce after 30 days was determined and the leaf/root ratio measured. The results are set out graphically in FIG. 2. From these results the following is apparent:

Treatment with the formulated oxicoal alone significantly reduced the leaf/root ratio when compared with treatment with the standard nutrient solution alone.

There was also a reduction in the leaf/root ratio when the treatment with formulated oxicoal was followed by treatment with the nutrient solution.

In the above experiments, the Hoagland's nutrient solution consisted of a mixture of 1 liter of a major nutrient solution (a) and 1 ml of a micro element solution (b) with the following compositions:

(a) Major Nutrients Solution
  $Ca(NO_3)_2$ — 1.18 g/liter
  $KNO_3$ — 0.51 g/liter
  $KH_2PO_4$ — 0.14 g/liter
  $MgSO_4.7H_2O$ — 0.49 g/liter
  Ferric Tartrate— 0.005 g/liter (b) Micro Element Solution
  0.6 g $H_3BO_3$/liter
  0.4 g $MnCl_2.4H_2O$/liter
  0.05 g $ZnSO_4$/liter
  0.05 g $CuSO_4.5H_2O$/liter
  0.02 g $H_2MoO_4.4H_2O$/liter

We claim:

1. A method of increasing the root to shoot ratio of a seedling during seedling growth includes the step of applying a coal-derived oxidation product in the form of a solution or a slurry having a pH in the range of 2 to 12 to the medium in which growth is to take place, the solution or slurry having no auxiliary plant nutrients or fertilizers present therein, the coal-derived product having the following elemental and functional group analysis on an air-dried basis:

| ELEMENTAL ANALYSIS | | |
|---|---|---|

-continued

| Element | Range (%) |
|---|---|
| Carbon | 30–70 |
| Hydrogen | 2–6 |
| Nitrogen | 0.1–5 |
| Sulphur | 0.1–10 |
| Oxygen | 15–45 |

| FUNCTIONAL GROUP ANALYSIS | |
|---|---|
| Functional Group | Range (meq/g) |
| Total acidity | 3–13 |
| Carboxylic groups | 0.5–12 |
| Phenolic groups | 0.5–9. |

2. A method according to claim 1 wherein the coal-derived oxidation product has the following elemental and functional group analysis on an air-dried basis:

| ELEMENTAL ANALYSIS | |
|---|---|
| Element | Range (%) |
| Carbon | 40–70 |
| Hydrogen | 2–6 |
| Nitrogen | 0.1–5 |
| Sulphur | 0.1–10 |
| Oxygen | 15–40 |

| FUNCTIONAL GROUP ANALYSIS | |
|---|---|
| Functional Group | Range (meq/g) |
| Total acidity | 3–12 |
| Caroxylic groups | 0.5–7 |
| Phenolic groups | 0.5–9. |

3. A method according to claim 2 wherein the product has the following elemental and functional group analysis on an air-dried basis:

| ELEMENTS | |
|---|---|
| Element | Percentage |
| Carbon | 51.3 |
| Hydrogen | 2.3 |
| Nitrogen | 1.5 |
| Sulphur | 0.5 |
| Oxygen | 28.7 |

| FUNCTIONAL GROUP ANALYSIS | |
|---|---|
| Functional Group | Amount (meq/g) |
| Total acidity | 6.25 |
| Carboxylic groups | 2.16 |
| Phenolic groups | 4.09. |

4. A method according to claim 1 wherein the coal-derived oxidation product is a soluble humate dissolved in water, the soluble humate having the following elemental and functional group analysis on an air-dried basis:

| ELEMENTAL ANALYSIS | |
|---|---|
| Element | Range (%) |
| Carbon | 30–70 |
| Hydrogen | 2–6 |
| Nitrogen | 0.5–5 |
| Sulphur | 0.1–10 |
| Oxygen | 20–45 |

| FUNCTIONAL GROUP ANALYSIS | |
|---|---|
| Functional Group | Range (meq/g) |
| Total acidity | 3–13 |
| Carboxylic groups | 0.5–12 |
| Phenolic groups | 0.5–9. |

5. A method according to claim 4 wherein the soluble humate has the following elemental and functional group analysis on an air-dried basis:

| ELEMENTS | |
|---|---|
| Element | Percentage |
| Carbon | 55.5 |
| Hydrogen | 2.7 |
| Nitrogen | 1.5 |
| Sulphur | 0.3 |
| Oxygen | 32.1 |

| FUNCTIONAL GROUP ANALYSIS | |
|---|---|
| Functional Group | Amount (meq/g) |
| Total acidity | 7.45 |
| Carboxylic groups | 3.38 |
| Phenolic groups | 4.07. |

6. A method of claim 4 wherein the humate is an alkali metal humate.

7. A method according to claim 1 wherein the pH of the solution or slurry is in the range of 5 to 9.

8. A method according to claim 4 wherein the pH of the solution or slurry is in the range 5 to 9.

9. A method according to claim 1 wherein the product is applied postemergence to the medium.

10. A method according to claim 9 wherein the concentration of the coal-derived oxidation product in the solution or slurry is up to 1000 mg/liter.

11. A composition for use as a seedling growth stimulant which comprises as an active ingredient, a coal-derived oxidation product in the form of a solution or slurry having a pH in the range of 2 to 12, the product having the following elemental and functional group analysis on an air-dried basis:

| ELEMENTAL ANALYSIS | |
|---|---|
| Element | Range (%) |
| Carbon | 30–70 |
| Hydrogen | 2–6 |
| Nitrogen | 0.1–5 |
| Sulphur | 0.1–10 |
| Oxygen | 15–45 |

| FUNCTIONAL GROUP ANALYSIS | |
|---|---|
| Functional Group | Range (meq/g) |
| Total acidity | 3–13 |
| Carboxylic groups | 0.5–12 |
| Phenolic groups | 0.5–9. |

* * * * *

UNITED STATES PATENT AND TRADEMARK OFFICE
CERTIFICATE OF CORRECTION

PATENT NO. : 5,302,524
DATED : April 12, 1994
INVENTOR(S) : Van De Venter et al

It is certified that error appears in the above-indentified patent and that said Letters Patent is hereby corrected as shown below:

On the title page: Item

"[73] Assignee: National Energy Council, Pretoria, South Africa to

--[73] Assignee: Enerkom (Pty) Limited, Sandown, Sandton, South Africa--.

Signed and Sealed this

Fifth Day of March, 1996

Attest:

BRUCE LEHMAN

Attesting Officer

Commissioner of Patents and Trademarks